United States Patent
Kurnianto

(10) Patent No.: US 9,566,708 B2
(45) Date of Patent: Feb. 14, 2017

(54) CONTROL MECHANISM FOR END-EFFECTOR MANEUVER

(71) Applicant: Daniel Kurnianto, Woburn, MA (US)

(72) Inventor: Daniel Kurnianto, Woburn, MA (US)

( * ) Notice: Subject to any disclaimer, the term of this patent is extended or adjusted under 35 U.S.C. 154(b) by 155 days.

(21) Appl. No.: 14/712,139

(22) Filed: May 14, 2015

(65) Prior Publication Data
US 2016/0332296 A1    Nov. 17, 2016

(51) Int. Cl.
*B29C 47/10*    (2006.01)
*B25J 9/02*    (2006.01)
(Continued)

(52) U.S. Cl.
CPC    *B25J 9/02* (2013.01); *B25J 9/003* (2013.01); *B25J 9/023* (2013.01); *B25J 9/04* (2013.01); *B25J 15/0019* (2013.01); *B29C 47/0014* (2013.01); *B29C 47/0801* (2013.01); *B29C 47/0813* (2013.01); *B29C 47/1045* (2013.01); *B29C 47/862* (2013.01); *B29C 67/0051* (2013.01); *B29C 67/0055* (2013.01); *B29C 67/0085* (2013.01); *B25J 9/0051* (2013.01); *B33Y 10/00* (2014.12); *B33Y 30/00* (2014.12); *Y10S 901/02* (2013.01); *Y10S 901/25* (2013.01); *Y10S 901/41* (2013.01)

(58) Field of Classification Search
CPC ........... B25J 15/0019; B25J 9/02; B25J 9/023; B25J 9/003; B25J 9/0051; B25J 9/04; B29C 47/0014; B29C 47/0801; B29C 47/0813; B29C 47/1045; B29C 67/0051; B29C 67/0055; B29C 67/0085; Y10S 901/02; Y10S 901/25; Y10S 901/41; B33Y 10/00; B33Y 30/00

USPC .......................................................... 425/375
See application file for complete search history.

(56) References Cited

U.S. PATENT DOCUMENTS 8,210,068 B2    7/2012    Feng
8,827,684 B1    9/2014    Schumacher et al.
(Continued)

FOREIGN PATENT DOCUMENTS

CN    203485190    3/2014
EP    2813328    12/2014
EP    2821186    1/2015

OTHER PUBLICATIONS

SeeMeCNC, "Orion Delta 3D Printer by SeeMeCNC", https://www.youtube.com/watch?v=S_jhEU8hQRs, published Jul. 30, 2013 by user "seemecnc".*

(Continued)

*Primary Examiner* — Matthew Daniels
*Assistant Examiner* — Lawrence D Hohenbrink, Jr.
(74) *Attorney, Agent, or Firm* — Eugene H. Nahm

(57) ABSTRACT

A control mechanism for maneuvering an end effector is provided. The control mechanism comprises multiple actuator assemblies, multiple arm assemblies, and the end effector. Each of the multiple arm assemblies connect the end effector and the multiple actuator assemblies respectively. Each multiple actuator assemblies controls the movement of the multiple arm assemblies independently. One of the arm is rotated by a tool actuator where the rotating motion of the rotating arm drives a tool attached at the end effector. The control mechanism positions the tool actuator away from the end effector, thereby operating the tool at a remote location away from the end effector.

20 Claims, 11 Drawing Sheets

(51) Int. Cl.
  *B25J 15/00*    (2006.01)
  *B25J 9/00*    (2006.01)
  *B25J 9/04*    (2006.01)
  *B29C 47/00*   (2006.01)
  *B29C 47/08*   (2006.01)
  *B29C 47/86*   (2006.01)
  *B29C 67/00*   (2006.01)
  *B33Y 30/00*   (2015.01)
  *B33Y 10/00*   (2015.01)

(56) References Cited

U.S. PATENT DOCUMENTS

2004/0086351 A1  5/2004  Kim et al.
2014/0054817 A1  2/2014  Jaffe
2014/0251058 A1  9/2014  Mihara et al.
2015/0035198 A1  2/2015  Saba

OTHER PUBLICATIONS

Flex3Drive, "Flexidrive is Flex3Drive Early Birds", http://forums.reprap.org/read.php?1,356635, published May 17, 2014 by user "Motley3D".*

* cited by examiner

CONTROL MECHANISM FOR END-EFFECTOR MANEUVER

BACKGROUND

Field of the Invention

The subject matter described herein relates generally to maneuvering robotics. More specifically, the present disclosure is related to a mechanism for maneuvering an end effector with delta robot arms.

Description of Related Art

Parallel robots, such as a delta robot, utilize multiple robotic arms to control orientation, motion, and placement of an end effector. Currently, most parallel robots uses actuators that are located at the base to maneuver the arms. The accuracy and efficiency maneuvering an end effector attached at one end of the robotic arms often relies on its overall structural design including center of mass and the mass itself.

The centralized actuation mechanism and the light material and structure of the parallel robots enables the parallel robots to have high movement speed, fast acceleration, and little inertia. For such reasons, delta robots are being used in various applications and industries, such as 3D printers, medical devices, pharmaceutical applications, assembly robots, and packaging robots, to name a few. The multiple robotic arms of a delta robot enable efficient maneuvering of the end effector and a speedy operation due to its light weight and multi-axes control mechanism. While the movement of the end effector is designed to utilize the advantages of the parallel robots, the end effector itself often is equipped with other tools and other components to perform various actions. The end effector is often integrated with different type of tools and their actuators to perform actions applicable for its usage, thereby increasing the moving mass of the end effector.

As a result, the end effectors of parallel robots often include weight of the actuators to perform their functions. This added weight leads to less efficient maneuvering, higher inertia, and slower movement of the end effector. For example, in the case of a 3D printer, delta robots are equipped with an extruder having motor in the end effector, controlling the operation of the extruder. Again, the additional motor adds significant weight to the end effector affecting the moment of inertia, velocity, and acceleration of the end effector. On the other hand, common extruder type known as "Bowden extruder" uses an indirect approach to feed the extruder with an extruder gear located away from the end effector. It uses a lengthy tube connected to the extruder to feed print filament which increases friction inside the tube, resulting in inefficient control of filament flow rate due to pushing and pulling motion on the filament along the tube. This is especially the case when using a stretchy filament.

Therefore, what is needed is a parallel robot mechanism for providing control of the end tool with adding minimal weight to it, to provide versatile movement of the end effector. There also is a need to provide a delta 3D printer that provides uniform flowrate of the filament being fed to the extruder without adding too much weight at the end effector.

SUMMARY

The subject matter of this application may involve, in some cases, interrelated products, alternative solutions to a particular problem, and/or a plurality of different uses of a single system or article.

In one aspect, a control mechanism for end effector maneuver is provided. The control mechanism may comprise an end effector, a plurality of arm assemblies, a plurality of actuator assemblies, and a tool actuator. Each of the plurality of arm assemblies may comprise at least two arms. Each of the plurality of actuator assemblies may comprise a guide member and a moving member, where the moving member may be moveable along the guide member. The plurality of arm assemblies respectively may connect the plurality of actuator assemblies to the end effector at each of their moving members, while each connecting joints may be pivotal.

The tool actuator may rotate at least one arm of the plurality of arm assemblies about its length, thereby providing a rotational motion to the rotating arm. In turn, the rotational motion may be translated from the tool actuator to a gear attached at the end effector through the rotating arm. The connecting joint between the end effector and the rotating arm may be a universal joint engaging the gear.

In another aspect, a method for controlling an end effector is provided. The method may begin with maneuvering an end effector by respectively actuating a plurality of arm assemblies with a plurality of actuator assemblies. Each of the plurality of actuator assemblies may comprise a guide member and a moving member, while the moving member may slidably engage the guide member. The plurality of arm assemblies may respectively connect the plurality of actuator assemblies, at each of their moving members, to the end effector in pivotal relation at each connecting joints. Each of the plurality of arm assemblies may further comprise at least two arms.

The method may further comprise rotating at least one arm of the plurality of arm assemblies about its length with a tool actuator to provide a rotational motion to the rotating arm. Further, the method may comprise translating the rotational motion to a gear attached at the end effector with a universal joint. The universal joint may engage the gear and be positioned at the connecting joint between the end effector and the rotating arm.

In yet another aspect, a control mechanism for end effector maneuver is provided. The control mechanism may comprise an end effector, a plurality of arm assemblies, a plurality of linear actuator assemblies, and a plurality of tool actuators. Each of the plurality of arm assemblies may comprise at least two arms. Each of the plurality of linear actuator assemblies may comprise a vertical guide member and a moving member, while the moving member may be moveable along the vertical guide member. The plurality of arm assemblies respectively may connect the plurality of linear actuator assemblies, at each of their moving members, to the end effector in pivotal relation at each connecting joints.

The plurality of tool actuators may respectively rotate at least one arm of the plurality of arm assemblies about its length, providing a rotational motion to each of the rotating arms of the control mechanism. The rotational motion may be translated respectively from the plurality of tool actuators to a plurality of gears attached at the end effector through the rotating arms. The connecting joints between the end effector and each of the rotating arms may be universal joints, each engaging one of the plurality of gears.

DETAILED DESCRIPTION

Figure 1A:
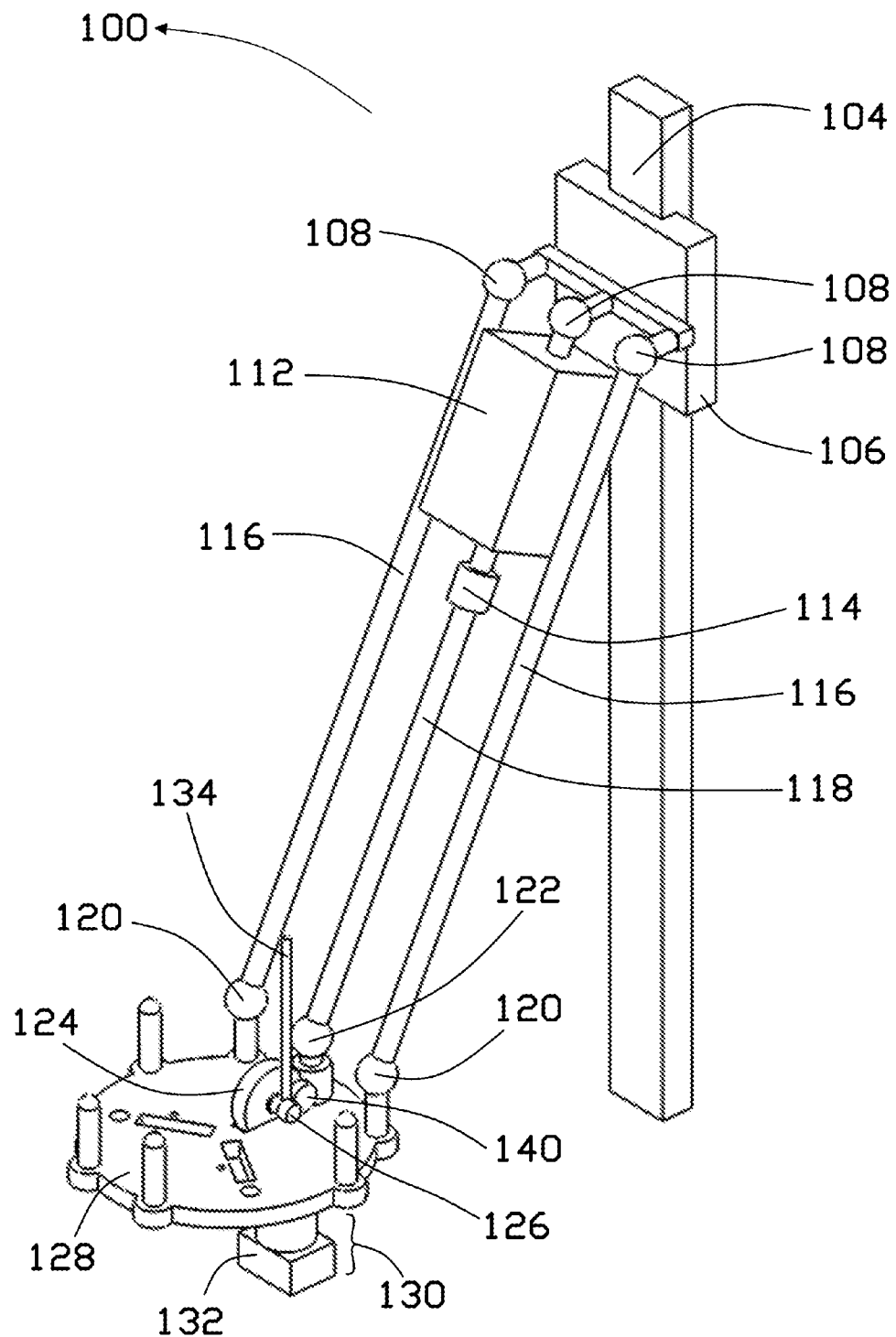
FIG. 1A provides a single actuator assembly to arm assembly of an exemplary embodiment of the control mechanism.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

In referring to the description, specific details are set forth in order to provide a thorough understanding of the examples disclosed. In other instances, well-known methods, procedures, components and materials have not been described in detail as not to unnecessarily lengthen the present disclosure.

It should be understood that if an element or part is referred to herein as being "on", "against", "in communication with", "connected to", "attached to" or "coupled to" another element or part, then it can be directly on, against, in communication with, connected to, attached to, or coupled to the other element or part, or intervening elements or parts may be present. When used, term "and/or", includes any and all combinations of one or more of the associated listed items, if so provided.

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

Various operations may be described as multiple discrete operations in turn, in a manner that may be helpful in understanding embodiments; however, the order of description should not be construed to imply that these operations are order dependent.

Spatially relative terms, such as "under" "beneath", "below", "lower", "above", "upper", "proximal", "distal", and the like, may be used herein for ease of description and/or illustration to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable. Such descriptions are merely used to facilitate the discussion and are not intended to restrict the application of disclosed embodiments.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

Some embodiments of the present disclosure may be practiced on a computer system that includes, in general, one or a plurality of processors for processing information and instructions, RAM, for storing information and instructions, ROM, for storing static information and instructions, a data storage unit such as a magnetic or optical disk and disk drive for storing information and instructions, modules as software units executing on a processor, an optional user output device such as a display screen device (e.g., a monitor) for display screening information to the computer user, and an optional user input device.

As will be appreciated by those skilled in the art, the present examples may be embodied, at least in part, a computer program product embodied in any tangible medium of expression having computer-usable program code stored therein. For example, some embodiments described below with reference to flowchart illustrations and/or block diagrams of methods, apparatus (systems) and computer program products can be implemented by computer program instructions. The computer program instructions may be stored in computer-readable media that can direct a computer, controller or other programmable data processing apparatus to function in a particular manner, such that the instructions stored in the computer-readable media constitute an article of manufacture including instructions and processes which implement the function/act/step specified in the flowchart and/or block diagram. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, reference is made to the accompanying drawings which are illustrations of embodiments in which the disclosed invention may be practiced. It is to be understood, however, that those skilled in the art may develop other structural and functional modifications without departing from the novelty and scope of the instant disclosure.

Generally, the present disclosure concerns a control mechanism for end effector maneuvering. The present disclosure provides an improved parallel robot where the actuator for the end tool is placed away from the end effector itself. The control mechanism of the present disclosure provides maneuvering of the end effector and its end tool without adding additional weight to the moving mass, thereby providing faster speed, acceleration, and lower moment of inertia in the end effector maneuvering.

Parallel robots typically have three arms moveably attached to the end effector. Some parallel robots may include more than three arms. In the prior art, parallel robots comprise a base where multiple actuators are mounted. The multiple actuators are coupled to one end of the arms and controls the movement of the arms. An end effector is attached at the other end of each of the arms by joints having multi-degree of freedom. The joints may include pivotal joints and joints that provide at least one rotational degree-of-freedom, such as, ball joints, spherical joints, and the like. Each of the arms may further be segmented into one or more segments adjoined by one or more joints of the same. The control of the actuators can maneuver the end effector parallel to the working surface and into desired positions allowed by the length of the arms by implementing parallelogram among the arms. Positions of each of the arms can be controlled by a controller in communication with the actuators to position the end effector at the desired position. In other applications, parallel robots may be controlled by six actuators providing six degrees of freedom.

Actuators contemplated herein may include, but are not limited to, different types of motors, such as linear actuators, rotational actuators, stepper motors, DC motors, and the like.

Controllers contemplated herein may be in electrical communication with various actuators to control the arm positions relative to the working surface. Different types of controller may be utilized, examples of controllers and its components contemplated herein may include, but are not limited to microcontrollers, integrated circuits, gate arrays, and the like. Controllers may also be in electrical communication with other components of the parallel robot including, but not limited to, tools, gears, worm gears, lead screws, threads, belts, pulleys, and the like. The controller may further be in communication with software applications, computing devices and networked processing units configured to control components of the parallel robots disclosed herein.

Computer or computing device contemplated herein may include, but are not limited to, virtual systems, Cloud/remote systems, desktop computers, laptop computers, tablet computers, handheld computers, smart phones and other cellular phones, and similar internet enabled mobile devices, digital cameras, a customized computing device configured to specifically carry out the methods contemplated in this disclosure, and the like.

Network contemplated herein may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or sub-networks, each of which may include, for example, a wired or wireless data pathway. The network may include a circuit-switched voice network, a packet-switched data network, or any other network able to carry electronic communications. Examples include, but are not limited to, Picture Transfer Protocol (PTP) over Internet Protocol (IP), IP over Bluetooth, IP over WiFi, and PTP over IP networks (PTP/IP).

A control mechanism for end effector maneuver is provided. The control mechanism benefits from a parallel robot having a tool actuator positioned away from an end effector and/or a center of mass of the parallel robot. The control mechanism may comprise an end effector, a plurality of actuator assemblies, a tool actuator, a plurality of arm assemblies and multiple connecting joints connecting the components of the control mechanism. Each of the plurality of arm assemblies may comprise two or more arms working together as an arm assembly. The plurality of actuator assemblies may each provide movement to each of the plurality of arm assemblies utilizing varying actuators, including a linear actuator.

Each of the plurality of arm assemblies may connect the end effector to the plurality of actuator assemblies. The connecting joints therein may be pivotal or flexible to allow three degrees of freedom motion at each of the connecting joints. Each of the actuator assemblies may change positions of the connected arm assembly, resulting in maneuvering of the end effector. The plurality of actuator assemblies may be controlled by a controller to collectively provide precise positioning of each of the arm assemblies, thereby providing precise maneuvering and placement of the end effector at a desired location in space. The controller may be in communication with each of the plurality of actuator assemblies via a network.

The tool actuator may provide a driving force to a tool that may be attached to the end effector. In a preferred embodiment, the tool actuator may rotate one of the arms of the plurality of arm assemblies about its length. The rotational motion of the rotating arm may provide a drive force necessary to operate the tool located at the end effector. The rotational motion generated by the tool actuator may be transferred through the rotating arm and to the tool by a series of gears or universal joints that allow translation of the rotational motion to a desired driving force to operate the tool.

As stated above, the control mechanism presented herein generates the drive force needed for operating the tool at the end effector from a remote location away from the end effector itself. The rotational motion of the rotating arm may be generated by the tool actuator placed away from the end effector. The rotating arm may be rotational about its length. In one embodiment, the tool actuator may be integrated to the rotating arm. This arrangement allows the tool actuator to directly rotate one of the arms of the plurality of arm assemblies. The connecting joint between the rotating arm and the end effector may be a universal joint which translates rotational motion from the rotating arm to the connecting joint.

Implementing universal joints at connecting joints of a structure allows translation of rotational motion throughout an entire structure having multiple segments where each segments may be at varying angles to one another. The universal joint, as used herein, allows the tool actuator to rotate other segments, components, and gears that are connected by the universal joint with the rotating arm. The rotational motion provided to the rotating arm is translated by the universal joint at its connecting joint and transferred to a subsequently connected segments, components, and gears, of the rotating arm.

In another embodiment, the tool actuator may be integrated to the actuator assembly. Each of the plurality of actuator assemblies may comprise a moving member connected to its arm assembly changing position of the arm assembly, thereby resulting in maneuvering of the end effector. The tool actuator may be attached to the moving member changing its position in unison with the moving member as it changes its position. This arrangement not only allows reducing the moving mass at the end effector, but also allows reducing the mass of the moving arm. The driving force to move the tool actuator is generated by the actuator assembly that carries the attached tool actuator at its moving member. The attached tool actuator may provide the rotational motion to the rotating arm by adjoining the tool actuator and the rotating arm with a universal joint. The connecting joint between the attached tool actuator and the rotating arm may comprise a universal joint to translate the rotational motion generated from the tool actuator to rotate one of the arms of the plurality of arm assemblies (i.e. the rotating arm).

In yet another embodiment, the tool actuator may be static. While the tool actuator provides the driving force for the rotational motion, the tool actuator may be independent from any moving components of the control mechanism. The tool actuator may be in mechanical communication with the rotating arm to provide the rotational motion translated by a series of linkages, gears, joints, and the like. In some embodiments, the control mechanism may comprise a spline shaft and a spline hub. The tool actuator may be connected to the spline shaft and may rotate the spline shaft about its length. The rotating spline shaft may transfer the rotational motion to one of the arms of the plurality of arm assemblies (i.e. the rotating arm). The spline hub may connect the rotating spline shaft and the rotating arm. The spline hub may provide pivotal relation and universal joint property between the rotating spline shaft and the rotating arm. The spline hub may be integrated with a universal joint.

Further, the spline hub may connect the rotating arm to its moving member of the actuator assembly, the connecting joint between the rotating arm and the moving member may be the spline hub. The spline hub may further slidably receive the spline shaft, such that the spline hub moves along the spline shaft as the moving member is in motion. As such, the rotating spline shaft, the rotating arm, and the moving member may all be connected to the spline hub. The addition of spline hub and spline shaft elements provide versatile selections and placements of the tool actuator. In some embodiments, the spline shaft may have multiple segments therein at various angles, each of which linked by a series of universal joints to translate rotational motion from one another, keeping the spline shaft rotating from first segment to the last about their own axes.

The actuator assembly may provide driving force to change the position of the arm assembly in connection. In some embodiment, the actuator assembly may comprise a moving member and a guide member. The moving member of the actuator assembly may moveably engage the guide member and be moveable along the guide member. The moving member and the guide member may be engaged with one another allowing movement of the moving member about the guide member. In one embodiment, the actuator assembly may be a linear actuator type. The guide member may be a vertical rail that provides linear motion guide to the moving member sliding on the guide member. Individually adjusting elevations of the plurality of moving members of the plurality of actuator assemblies allow maneuvering of the end effector to a desired placement in space.

In another embodiment, the guide member may be a horizontal rail that provides linear motion of the moving member horizontally with respect to the working surface. Similarly, individual positioning of each of the plurality of moving members of the plurality of actuator assemblies horizontally may allow maneuvering of the end effector. In yet another embodiment, the guide member may implement motion of the moving member in x-y-z directions either severally or collectively. Various designs of guide member is possible. In a further embodiment, the actuator assembly may be a rotational actuator, where the guide member provides a pivot point allowing the moving member to revolve about the pivot point.

The control mechanism may comprise a plurality of arm assemblies and corresponding plurality of actuator assemblies. The two or more arms of each of the arm assemblies may be aligned at a distance to one another and collectively working together to form a single arm assembly that connects the end effector and one of the plurality of actuator assemblies. In one embodiment, the control mechanism may comprise three assemblies implanting a parallelogram to maneuver the end effector. In another embodiment, each of the arm assemblies may comprise three arms, one of which may be rotated by the tool actuator. In yet another embodiment, there may be one or more tool actuators each being positioned to respectively rotate one arm of each of the plurality of arm assemblies.

Number of rotating arms that the control mechanism may implement in the plurality of arm assemblies can be varying to meet the desired requirements of end effector maneuvering. By varying the number of rotating arms, it is possible to operate multiple tools connected to the end effector. In some embodiments, multiple tools may be attached to the end effector, each being respectively driven by the rotating arms of the plurality of arm assemblies. Each of the multiple tools may be in mechanical communication with one of the rotating arms via a series of joints, gears, and the like, placed at the end effector. Thereby, the rotational motion of the rotating arms of the plurality of arm assemblies can drive each of the multiple tools connected to the end effector. This allows the control mechanism to implement various combinations of different types of tools at the end effector designed to perform different and/or multiple functions.

The end effector of the control mechanism may be maneuvered parallel to the working surface. The plurality of actuator assemblies, in communication with the controller, may maneuver the end effector in a planar motion at varying elevations within the limits of the space defined by the length of the plurality of arm assemblies. One of the key feature of the parallel robots and the delta robots is their use of parallelogram in the arm assemblies that connects the end effector to the corresponding actuator assembly. Each of the plurality of arm assemblies pivotally attached to the end effector may establish a parallelogram linkage. In some embodiments, the two or more arms comprising each of the arm assemblies may be aligned parallel to one another and have the same length. Similarly, in some embodiments, each of the plurality of arm assemblies may have the same length.

In another embodiment, other types of actuators, may be implemented to provide additional degree of freedom to the movement of the end effector. For example, parallel robot for flight simulation uses all 6 degree of motions, which includes motions that are not parallel to the working surface, such as roll and yaw.

The tool may be positioned at the end effector driven by the rotational motion originated from the tool actuator, transferred by the rotating arm, and translated by one or more gears and joints. Motion translation and transfer from rotational motion of the rotating arm to linear or other types of mechanical motion may be achieved by various combination and series of gears engaging the universal joint. The types of gear may include, but not limited to, worm gear, spur gear, straight bevel gear, spiral bevel gear, hypoid gear, planetary gear, helical gear, herringbone gear, and the like. These and other type of mechanical motional transfer would be apparent to those having ordinary skill in the art.

The one or more gears may be in mechanical communication with the universal joint at various arrangements depending on the type of gear being used. Such arrangements of the one or more gears engaging the universal joint may make it possible to implement different types of tools serving various functions. The tool placed at the end effector and engaging the universal joint may be of any type of tools such as pick-up tool, screwing tool, extruding tool, and the like. In some embodiments, actuation of the various types of tools may be achieved by transferring the rotational motion from the rotating arm to the tool through the universal joint engaging the one or more gears as described above.

In one embodiment, the control mechanism may be utilized in delta style three-dimensional printer. The tool may be an extruder extruding a filament. A delta style three-dimensional printer often uses extruder to provide the filament to print a three-dimensional object. In this embodiment, the extruder may be coupled to the end effector extruding the filament out at the extruder tip. The rotational motion of the rotating arm may be translated by the universal joint, which connects the rotating arm to the end effector. The universal joint and its rotational motion may be transferred to a worm gear in mechanical engagement with the universal joint. The motion of the worm gear may further be transferred to a worm wheel engaging the worm gear, this exemplary arrangement of gears can translate the rotational motion of the rotating arm about its length to a rotational motion having axis that is perpendicular to that of the worm gear. The motion of the worm wheel may provide a drive necessary to feed the filament into the extruder, thereby extruding the filament out at the extruder tip. In some embodiments, bearings, rollers, and other types of free-spinning mechanical elements may be positioned at the end effector to retain the filament in contact with the worm wheel.

Various types and materials of filaments may be utilized for the extruder. The filament can be directly fed through the extruder tip. Such direct feeding of the filament at the extruder reduces friction that is caused by the type of filament feeder that includes a long tube that feeds the filament indirectly. The direct feeding of the filament to the extruder ensures constant flow rate and control of the filament input and output, this is especially the case when dealing with stretchy/pliable type of filaments.

In another embodiment, the extruder may comprise a heating element positioned to apply heat to the filament being fed through the extruder. The applied heat melts the filament or makes the filament moldable for three-dimensional printing.

While some embodiments of the control mechanism disclosed herein provide working examples of a delta style three-dimensional printer, the scope of the invention should not be limited by such examples.

Further, methods for using the control mechanism contemplated herein are disclosed. In one embodiment, a method for controlling an end effector is provided. The method comprises the steps of maneuvering the end effector, rotating at least one arm of the plurality of arm assemblies, and translating the rotational motion of the rotating arm to the gear at the end effector. The end effector may be maneuvered by respectively actuating and controlling the plurality of arm assemblies with the plurality of actuator assemblies. Each of the plurality of actuator assemblies may be controlled by changing the position of the moving members of each of the plurality of actuator assemblies, either individually or collectively. The at least one arm of the plurality of arm assemblies may be rotated by the tool actuator to provide the rotational motion to the at least one arm. The rotational motion of this rotating arm may be translated to the gear attached at the end effector by a universal joint engaging the gear. In another embodiment, the method may further comprise the step of operating the tool in mechanical communication with the gear.

Figure 1B:
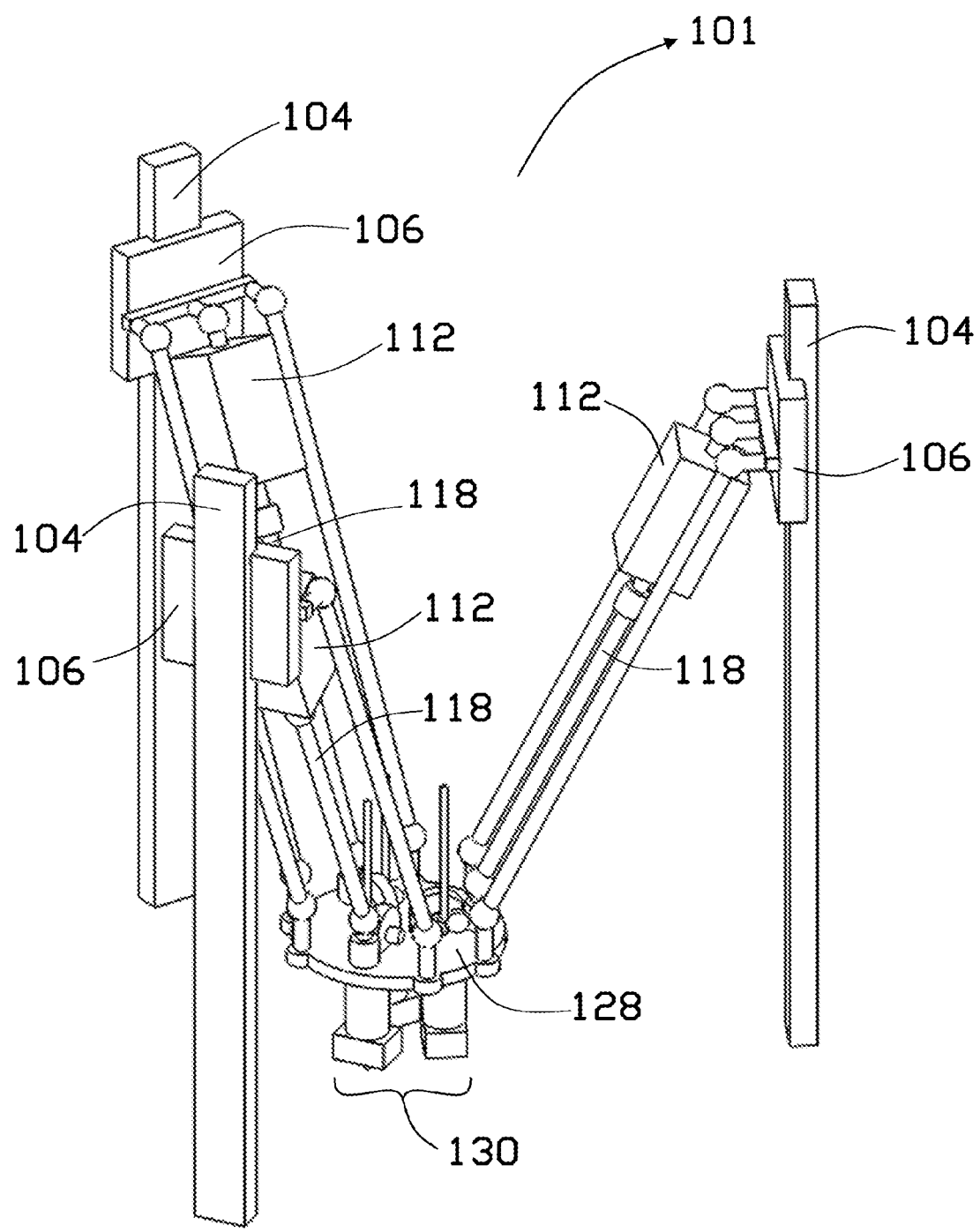
FIG. 1B provides a fully constructed exemplary embodiment of the control mechanism of FIG. 1A.
Figure 1C:
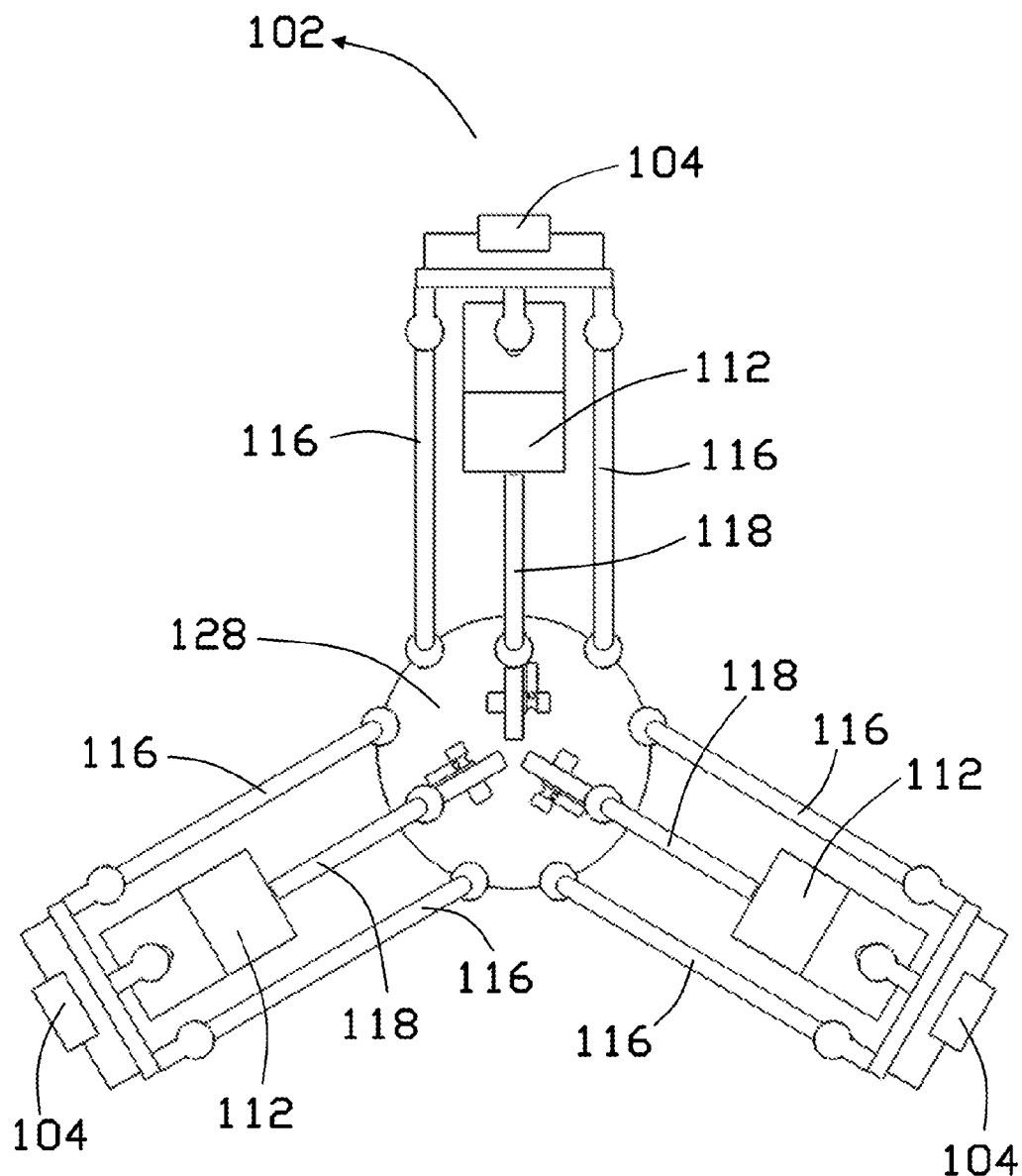
FIG. 1C provides a top view of the exemplary embodiment of the control mechanism.

Turning now to FIG. 1A, FIG. 1B, and FIG. 1C, an exemplary embodiment of the control mechanism for end effector maneuver is presented in various views. FIG. 1A illustrates a single actuator to arm assembly 100 of the exemplary embodiment of the control mechanism. FIG. 1B describes a fully constructed exemplary embodiment 101 of the control mechanism. Lastly, FIG. 1C illustrates a top view 102 of the exemplary embodiment of the control mechanism.

In this exemplary embodiment, the end effector 128 may be pivotally connected to each of the actuator assemblies by the arm assembly comprising three arms 116 118 116. Each of the actuator assemblies may comprise the moving member 106 and the guide member 104. One ends of the arm assembly may be pivotally connected to the moving member 106 by pivotal joints, such as ball joints 108. The opposite ends of the arm assembly may also be pivotally connected as well by pivotal joints 120 122 to the end effector 128. The tool actuator 112 may be integrated to the rotating arm 118, driving the rotational motion in the rotating arm 118 about its length. The rotational motion may be translated by the pivotal joint 122, which may be a universal joint 122. The universal joint 122 translates the rotational motion of the rotating arm 118. The coupling 114 may be utilized to connect the tool actuator 112 to the rotating arm 118.

The end effector 128 may comprise the extruder 130 attached thereto. The extruder 130 may be in mechanical communication with the rotating arm to be operational. In this embodiment, the rotational motion of the rotating arm 118 drives the worm wheel 124 and the worm wheel extension 126 via the universal joint 122. The worm wheel extension 126 may be formed by the worm wheel 124 configured to engage the filament 134. The filament 134 may be positioned to be extruded by the extruder 130. The filament 134 may be gripped and driven by the worm wheel extension 126 and a free-spinning mechanical elements, such as a roller 140. The roller 140 urges the filament 134 against the worm wheel extension 126. The filament 134 may be fed through the extruder 130 which may comprise the heating element 132 to apply heat to the filament 134 being extruded.

As shown in FIG. 1B and FIG. 1C, the control mechanism for end effector maneuver may comprise three actuator assemblies each connected to the end effector 128 by three arm assemblies. Each of the three arms, 116 and 118, may be extending parallel to each other, implementing parallelogram in the control mechanism. The three tool actuators 112 of the three arm assemblies each may provide the force to drive the three extruders 130 mechanically linked to the end effector 128. As the end effector retains the extruder, this embodiment illustrates a three-dimensional printer application of the control mechanism. The movement of each of the moving members 106 may be vertical along the guide members 104.

Figure 1D:
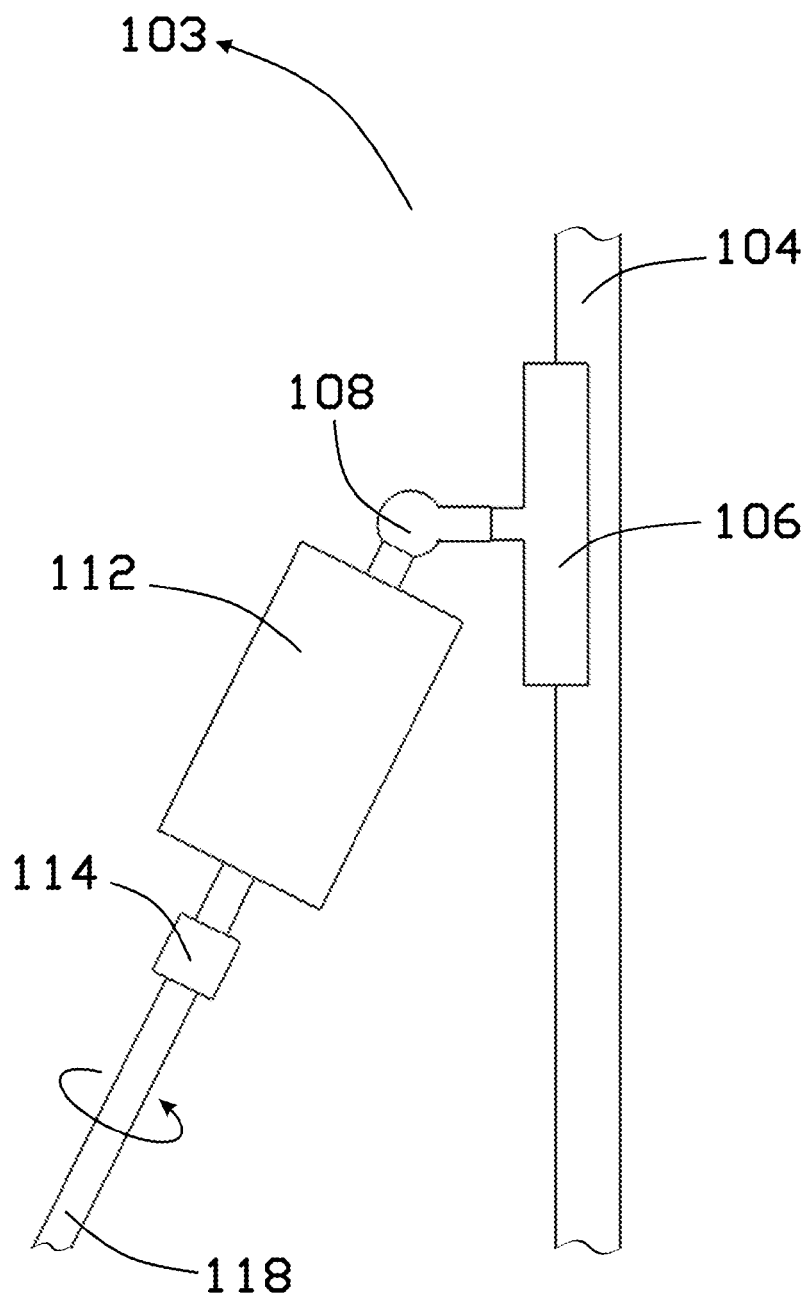
FIG. 1D provides an exemplary embodiment showing the linkage between the actuator assembly and the rotating arm.

FIG. 1D is an exemplary embodiment showing the linkage between the actuator assembly and the rotating arm 103. The tool actuator 112 may rotate the rotating arm 118 about its length. In this embodiment, the tool actuator 112 is integrated to the rotating arm 118 via the coupling 114. The rotating arm 118 integrated with the tool actuator 112 may further be in connection with the moving member 106 by the pivotal joint 108 (i.e. a ball joint). The moving member 106 may be slideable along the vertical rail 104.

Figure 1E:
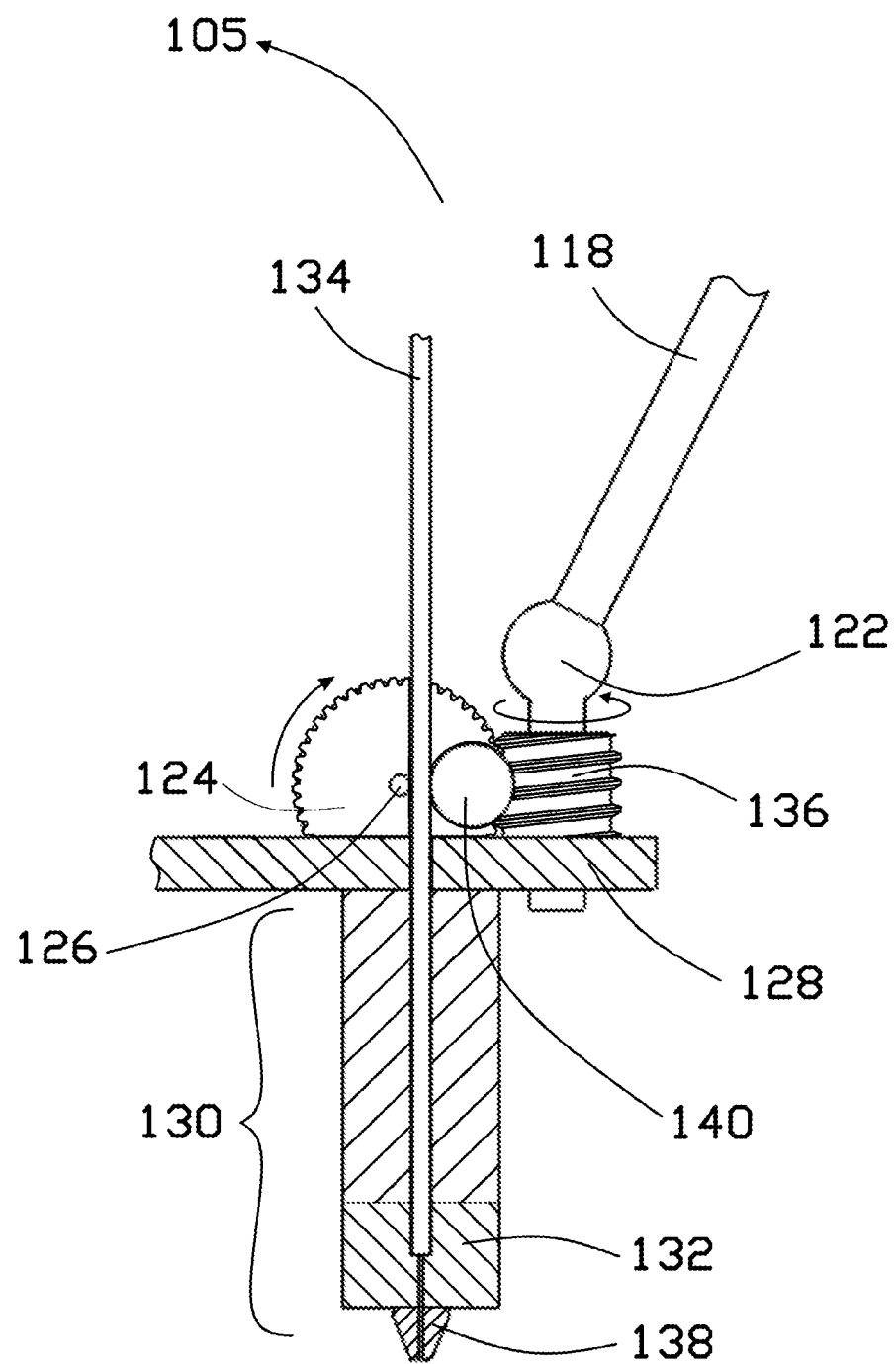
FIG. 1E provides a cross sectional view of the end effector including the extruder.

FIG. 1E illustrates a cross sectional view of the end effector including the extruder. The cross sectional view of the extruder assembly 105 shows gears and joints that allow transfer and translation of motion to drive the tool located at the end effector 128. A worm gear 136 may be in mechanical communication with the universal joint 122 rotating about its axis. The rotational motion of the rotating arm 118 may be transferred to the worm gear 136 via the universal joint 122. At the worm gear 136, the worm wheel 124 may be engaging the worm gear 136, thereby translating the motion of the worm gear 136 to a rotational motion about an axis perpendicular to that of the worm gear 136. The worm gear 136 and the worm wheel 124 may be positioned at the end effector 128.

The end effector 128 may further comprise a tool attached thereto. The tool may be the extruder 130, which receives the filament 134 and extrudes it out at the extruder tip 138. The filament 134 may be urged between the worm wheel extension 126 and the roller 140. The worm wheel extension 126 may grip the filament 134 against the roller 140, as the rotation of the worm wheel extension 126 pushes the filament 134 down to the extruder 130. The worm wheel extension 126 may be formed by the worm wheel 124 configured to grip the filament 134. The extruder 130 may comprise the heating element 132 to apply heat to the filament 134.

Figure 2A:
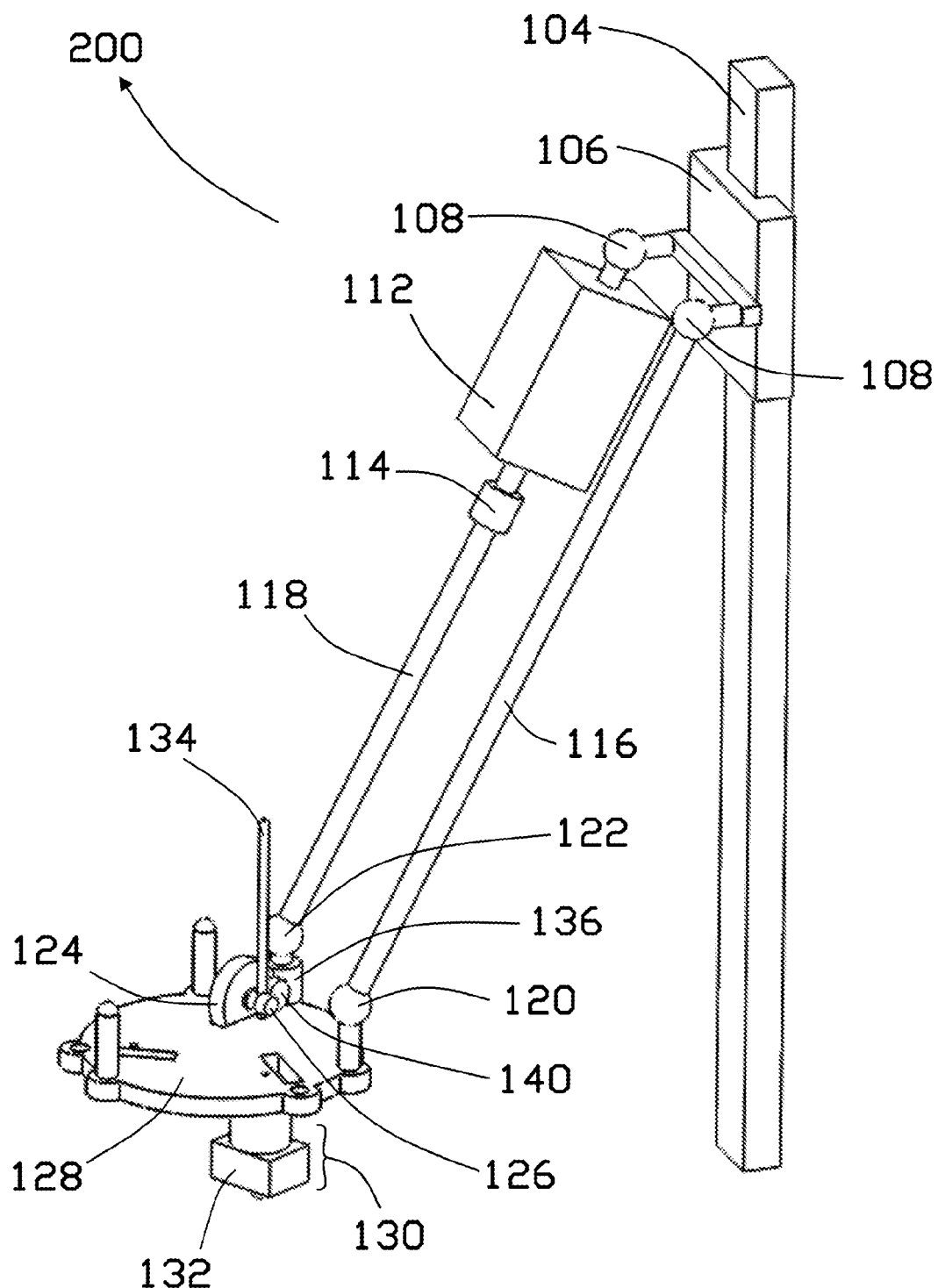
FIG. 2A provides a single actuator assembly to arm assembly of another exemplary embodiment of the control mechanism.
Figure 2B:
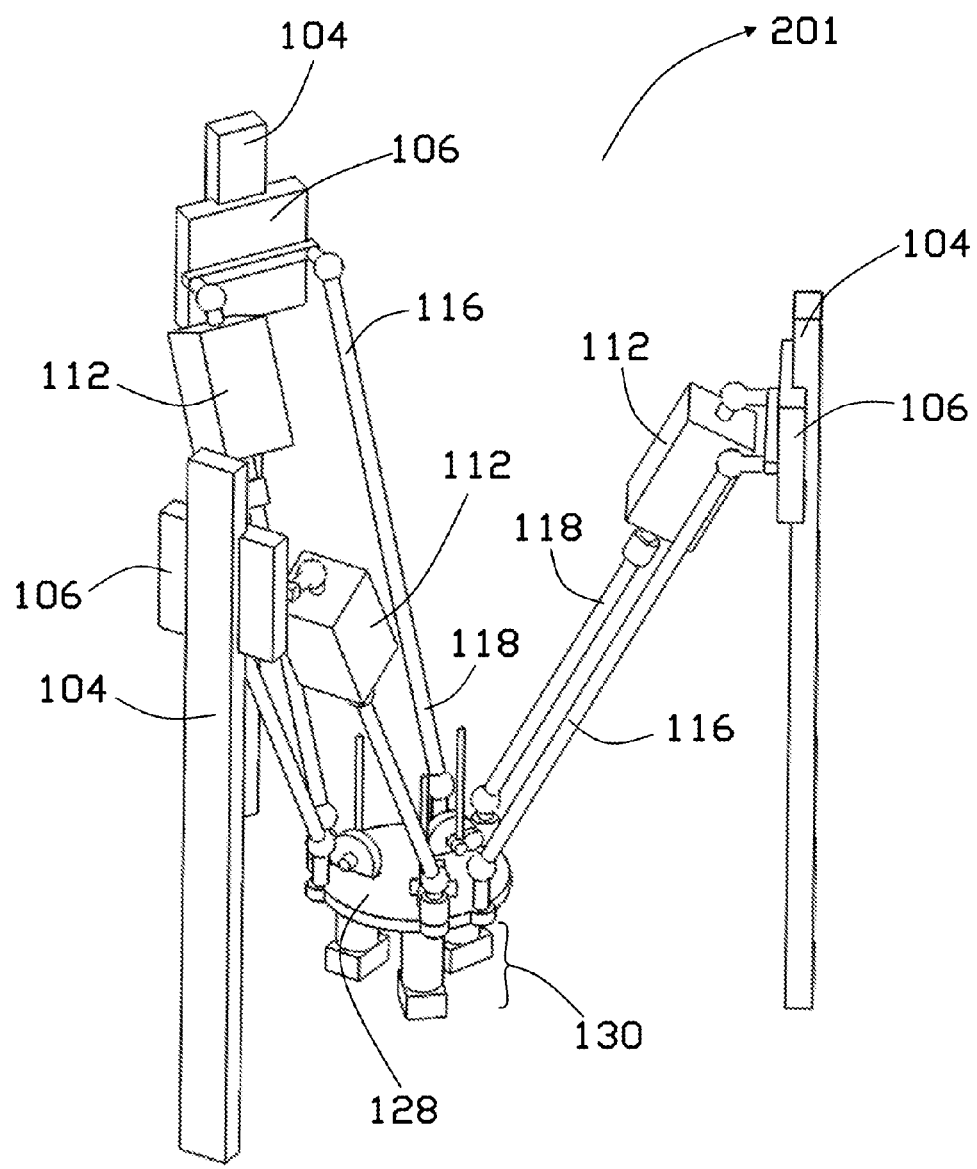
FIG. 2B provides a fully constructed exemplary embodiment of the control mechanism of FIG. 2A.

FIG. 2A and FIG. 2B illustrate an exemplary embodiment of the control mechanism for end effector maneuver. FIG. 2A illustrates a single actuator to arm assembly 200 of the exemplary embodiment of the control mechanism. FIG. 2B describes a fully constructed exemplary embodiment 201 of the control mechanism.

In this exemplary embodiment, the end effector 128 may be pivotally connected to each of the actuator assemblies by the arm assembly comprising two arms 116 118. Each of the actuator assemblies may comprise the moving member 106 and the guide member 104. One ends of the arm assembly may be pivotally connected to the moving member 106 by pivotal joints, such as ball joints 108. The opposite ends of the arm assembly may also be pivotally connected as well by pivotal joints 120 122 to the end effector 128. The tool actuator 112 may be integrated to one of the two arms to rotate the one arm, the rotating arm 118. The tool actuator 112 may drive the rotational motion in the rotating arm 118 about its length. The rotational motion may be translated by the pivotal joint 122, which may be a universal joint 122. The universal joint 122 translates the rotational motion of the rotating arm 118. The coupling 114 may be utilized to connect the tool actuator 112 to the rotating arm 118.

The end effector 128 may comprise the extruder 130 attached thereto. The extruder 130 may be in mechanical communication with the rotating arm to be operational. In this embodiment, the rotational motion of the rotating arm 118 drives the worm gear 136, worm wheel 124, and the worm wheel extension 126 via the universal joint 122. The worm wheel extension 126 may be formed by the worm wheel 124 configured to engage the filament 134. The filament 134 may be positioned to be extruded by the extruder 130. The filament 134 may be gripped and driven by the worm wheel extension 126 and a free-spinning mechanical elements, such as a roller 140. The roller 140 urges the filament 134 against the worm wheel extension 126. The filament 134 may be fed through the extruder 130 which may comprise the heating element 132 to apply heat to the filament 134 being extruded.

As shown in FIG. 2B, the control mechanism for end effector maneuver may comprise three actuator assemblies each connected to the end effector 128 by three arm assemblies. Each of the two arms, 116 and 118, may be extending parallel to each other, implementing parallelogram in the control mechanism. The three tool actuators 112 of the three arm assemblies each may provide the force to drive the three extruders 130 mechanically linked to the end effector 128.

Figure 3A:
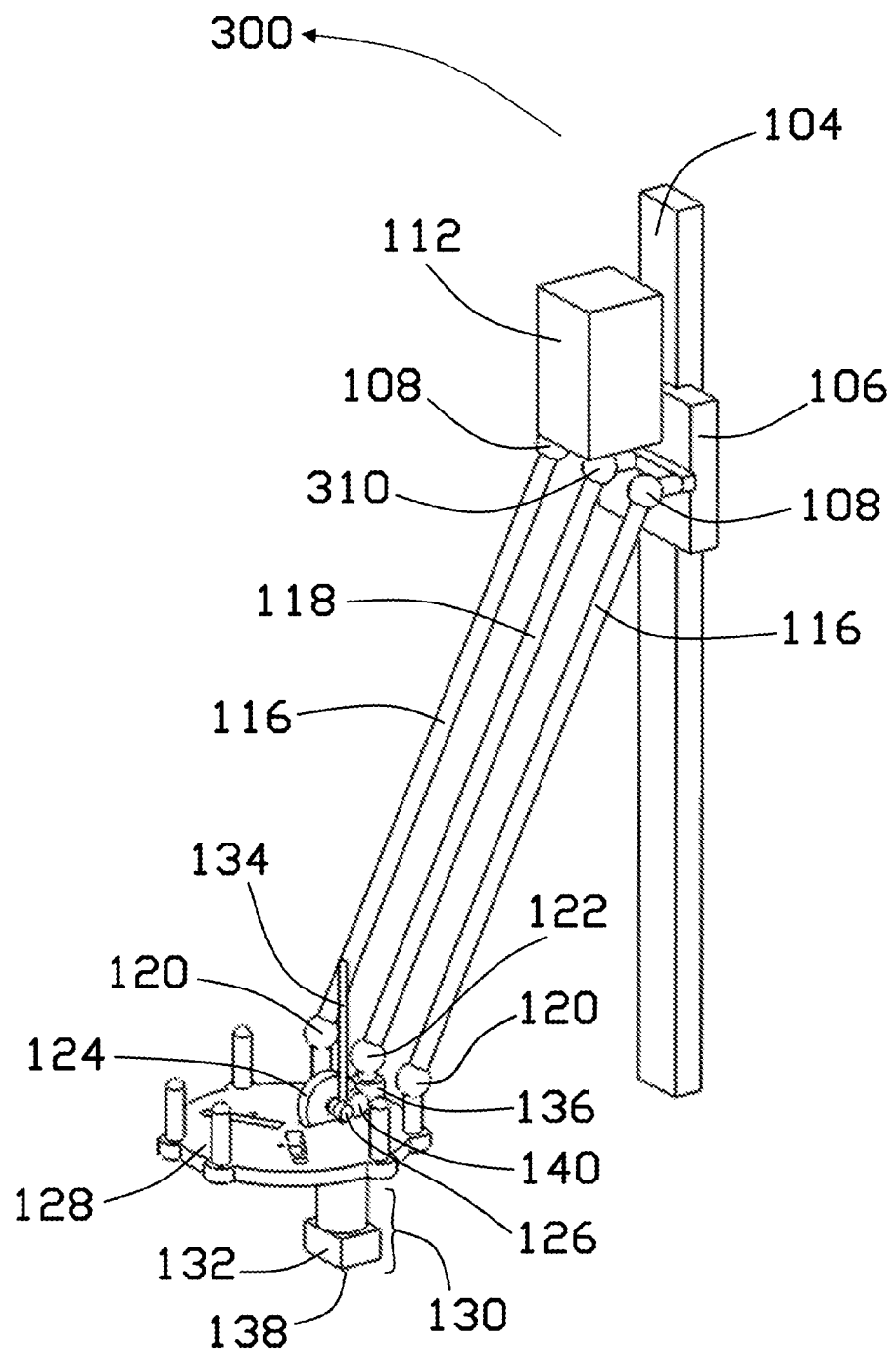
FIG. 3A provides a single actuator assembly to arm assembly of a further exemplary embodiment of the control mechanism.
Figure 3B:
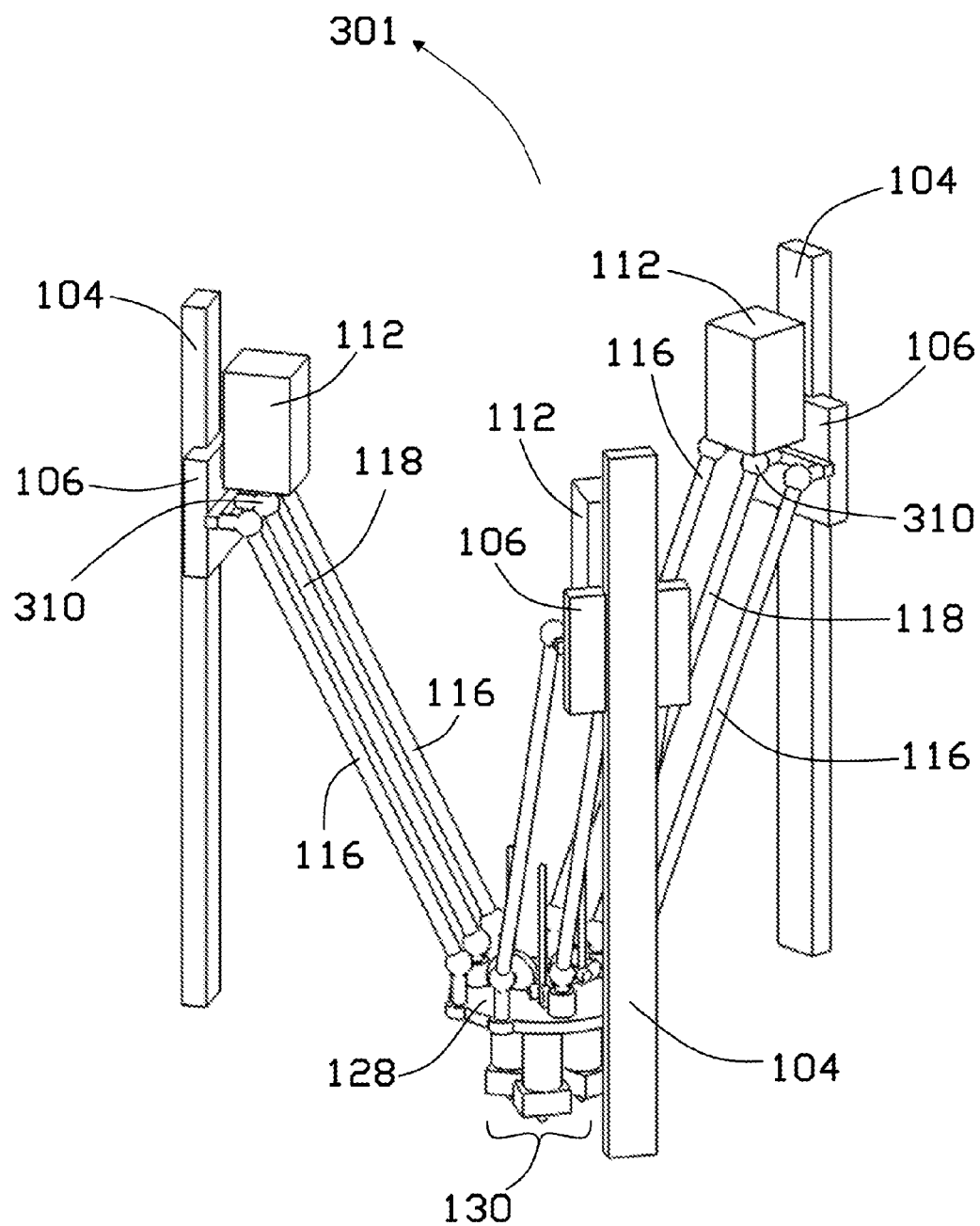
FIG. 3B provides a fully constructed exemplary embodiment of the control mechanism of FIG. 3A.

Turning now to FIG. 3A and FIG. 3B, another exemplary embodiment of the control mechanism for end effector maneuver is presented. FIG. 3A illustrates a single actuator to arm assembly 300 of the exemplary embodiment of the control mechanism. FIG. 3B describes a fully constructed exemplary embodiment 301 of the control mechanism.

In this exemplary embodiment, the end effector 128 may be pivotally connected to each of the actuator assemblies by the arm assembly comprising three arms 116 118. Each of the actuator assemblies may comprise the moving member 106 and the guide member 104. One ends of the arm assembly may be pivotally connected to the moving member 106 by pivotal joints, such as ball joints 108. The opposite ends of the arm assembly may also be pivotally connected as well by pivotal joints 120 122 to the end effector 128. The tool actuator 112 may be attached to the actuator assembly at its moving member 106. The tool actuator 112 may change its position in unison with the moving member 106, as it changes its position along the guide member 104.

The tool actuator 112 may drive the rotational motion in the rotating arm 118 about its length. The rotational motion may be translated by the pivotal joint 122, which may be a universal joint 122. The universal joint 122 translates the rotational motion of the rotating arm 118. The tool actuator 112 may provide the rotational motion to the rotating arm 118 by linking the tool actuator 112 and the rotating arm 118 with a universal joint 310. The connecting joint 310 between the tool actuator 112 and the rotating arm 118 may comprise a universal joint to translate the rotational motion generated from the tool actuator 112 to rotate one of the arms 118 of the three arm assemblies.

The end effector 128 may comprise the extruder 130 attached thereto. The extruder 130 may be in mechanical communication with the rotating arm to be operational. In this embodiment, the rotational motion of the rotating arm 118 drives the worm gear 136, the worm wheel 124, and the worm wheel extension 126 via the universal joint 122. The worm wheel extension 126 may be formed by the worm wheel 124 configured to engage the filament 134. The filament 134 may be positioned to be extruded by the extruder 130. The filament 134 may be gripped and driven by the worm wheel extension 126 and a free-spinning mechanical elements, such as a roller 140. The roller 140 urges the filament 134 against the worm wheel extension 126. The filament 134 may be fed through the extruder tip 138 which may comprise the heating element 132 to apply heat to the filament 134 being extruded.

As shown in FIG. 3B, the control mechanism for end effector maneuver may comprise three actuator assemblies each connected to the end effector 128 by three arm assemblies. Each of the three arms, 116 and 118, may be extending parallel to each other, implementing parallelogram in the control mechanism. The three tool actuators 112 of the three arm assemblies each may provide the force to drive the three extruders 130 mechanically linked to the end effector 128.

Figure 4A:
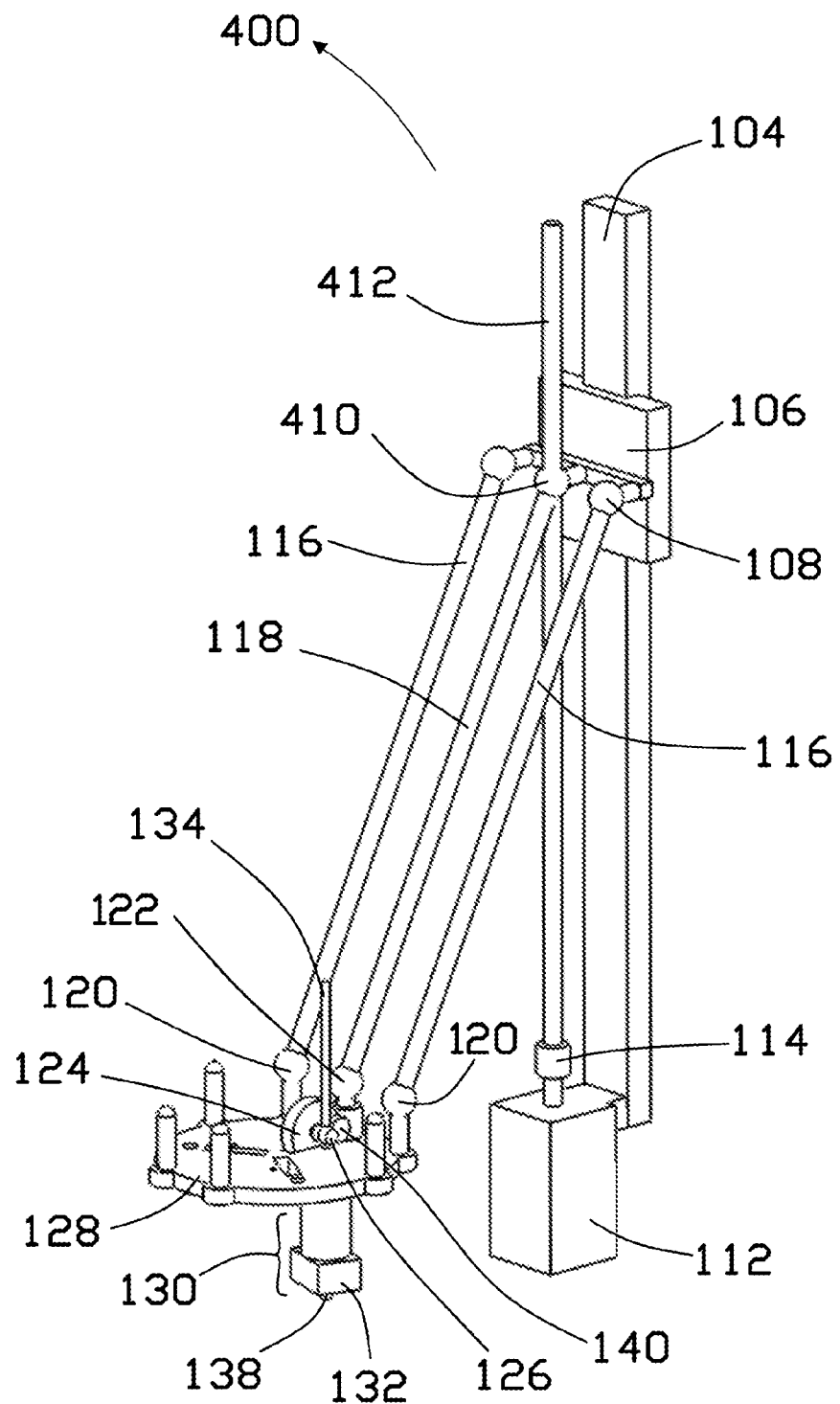
FIG. 4A provides a single actuator assembly to arm assembly of yet another exemplary embodiment of the control mechanism.
Figure 4B:
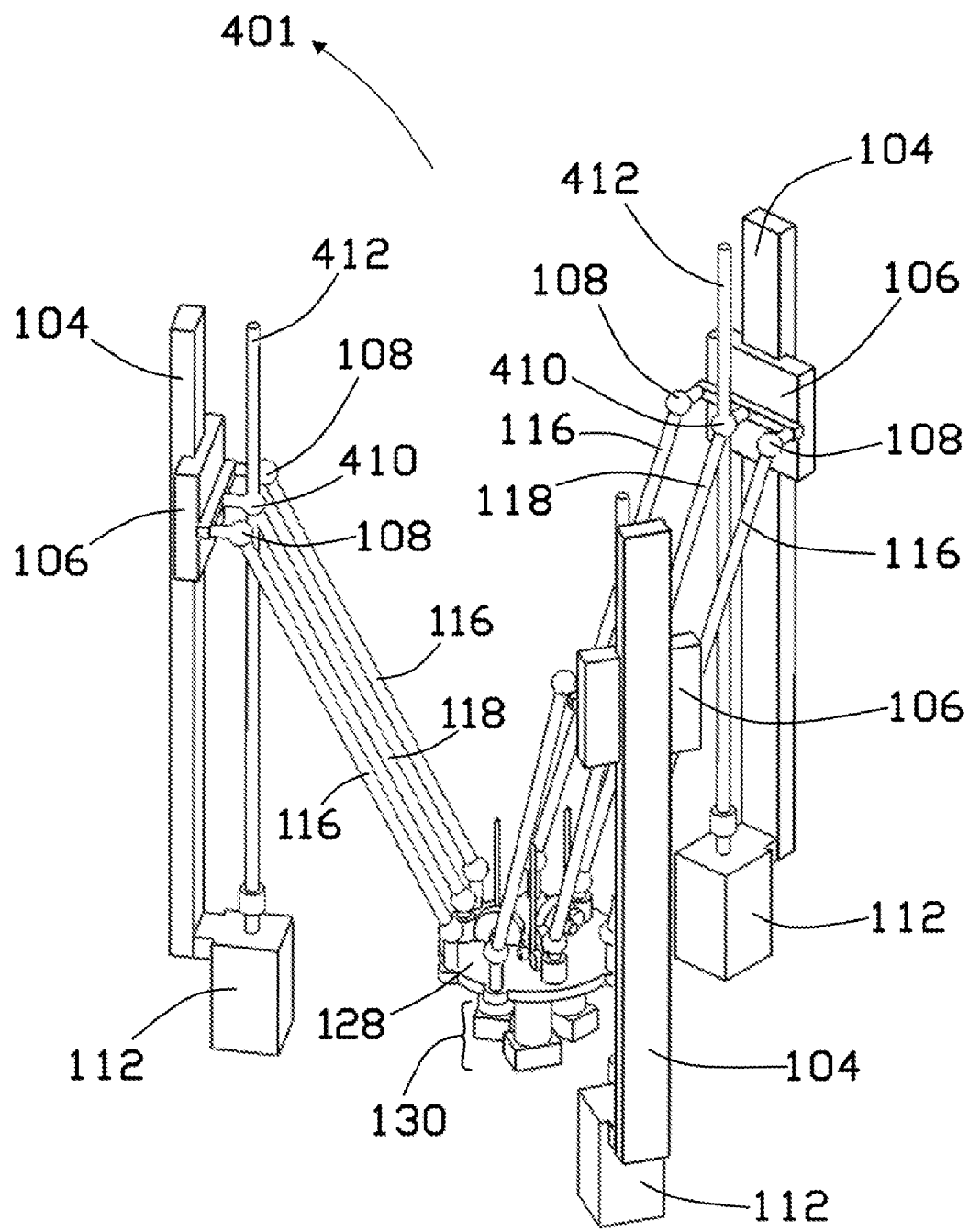
FIG. 4B provides a fully constructed exemplary embodiment of the control mechanism of FIG. 4A.

FIG. 4A and FIG. 4B illustrate a further exemplary embodiment of the control mechanism for end effector maneuver. FIG. 4A illustrates a single actuator to arm assembly 400 of the exemplary embodiment of the control mechanism. FIG. 4B describes a fully constructed exemplary embodiment 401 of the control mechanism.

In this exemplary embodiment, the end effector 128 may be pivotally connected to each of the actuator assemblies by the arm assembly comprising three arms 116 118. Each of the actuator assemblies may comprise the moving member 106 and the guide member 104. One ends of the arm assembly may be pivotally connected to the moving member 106 by pivotal joints, such as ball joints 108. The opposite ends of the arm assembly may also be pivotally connected as well by pivotal joints 120 122 to the end effector 128. The tool actuator 112 may be statically in mechanical communication with the rotating arm 118. The tool actuator 112 may provide the driving force for the rotational motion of the rotating arm 118. In this embodiment, the control mechanism 400 401 may comprise a spline shaft 412 and a spline hub 410. The tool actuator 112 may be connected to the spline shaft 412 rotating the spline shaft 412 about its length. The rotating spline shaft 412 may provide the rotational motion to one of the arms of the plurality of arm assemblies 118 (i.e. the rotating arm).

The spline hub 410 may connect the rotating spline shaft 412 and the rotating arm 118. The spline hub 410 may provide pivotal relation and universal joint property between the rotating spline shaft 412 and the rotating arm 118. The spline hub 410 may be integrated with a universal joint. Further, the spline hub 410 may connect the rotating arm 118 to its moving member 106 of the actuator assembly. The connecting joint between the rotating arm and the moving member may be the spline hub 410. The spline hub 410 may further slidably receive the spline shaft 412, such that the spline hub 410 moves along the spline shaft 412 as the moving member 106 is in motion. As such, the rotating spline shaft 412, the rotating arm 118, and the moving member 106 may all be connected to the spline hub 410. The coupling 114 may be utilized to connect the tool actuator 112 to the spline shaft 412.

The end effector 128 may comprise the extruder 130 attached thereto. The extruder 130 may be in mechanical communication with the rotating arm 118 to be operational. In this embodiment, the rotational motion of the rotating arm 118 drives the worm gear, worm wheel 124, and the worm wheel extension 126 via the universal joint 122. The worm wheel extension 126 may be formed by the worm wheel 124 configured to engage the filament 134. The filament 134 may be positioned to be extruded by the extruder 130. The filament 134 may be gripped and driven by the worm wheel extension 126 and a free-spinning mechanical elements, such as a roller 140. The roller 140 urges the filament 134 against the worm wheel extension 126. The filament 134 may be fed through the extruder tip 138 which may comprise the heating element 132 to apply heat to the filament 134 being extruded.

As shown in FIG. 4B, the control mechanism for end effector maneuver may comprise three actuator assemblies each connected to the end effector 128 by three arm assemblies. Each of the three arms, 116 and 118, may be extending parallel to each other, implementing parallelogram in the control mechanism. The three tool actuators 112 of the three arm assemblies each may provide the force to drive the three extruders 130 mechanically linked to the end effector 128.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth.

Those skilled in the art will readily observe that numerous modifications, applications and alterations of the device and method may be made while retaining the teachings of the present disclosure.

What is claimed is:

1. A control mechanism for end effector maneuver comprising:
   an end effector;
   a plurality of arm assemblies, each of the plurality of arm assemblies comprising at least two arms;
   a plurality of actuator assemblies, each of the plurality of actuator assemblies comprising a guide member and a moving member, the moving member being moveable along the guide member, the plurality of arm assemblies respectively connecting the plurality of actuator assemblies, at each of their moving members, to the end effector in pivotal relation at each connecting joints; and
   a tool actuator rotating at least one arm of the plurality of arm assemblies about its length, thereby providing a rotational motion to the rotating arm, wherein the rotational motion is translated from the tool actuator to a gear attached at the end effector through the rotating arm, the connecting joint between the end effector and the rotating arm is a universal joint engaging the gear.

2. The control mechanism for end effector maneuver of claim 1 wherein the tool actuator is integrated to the rotating arm.

3. The control mechanism for end effector maneuver of claim 1 wherein the tool actuator is attached to the moving member, the tool actuator being positioned to rotate the rotating arm, such that the rotational motion is provided to the rotating arm from the tool actuator through a universal joint connecting the tool actuator and the rotating arm.

4. The control mechanism for end effector maneuver of claim 1 further comprising a spline shaft and a spline hub, the spline hub slidably receiving the spline shaft, the spline hub pivotally connecting the rotating arm to the moving member at its connecting joint, such that the spline hub slides along the spline shaft as the moving member moves along the guide member, the tool actuator being attached to the spline shaft and rotating the spline shaft, the rotational motion being provided to the rotating arm transferred from the rotating spline shaft through the spline hub.

5. The control mechanism for end effector maneuver of claim 1 further comprising an extruder positioned at the end effector, the extruder being driven by the rotational motion, wherein the extruder is in mechanical communication with the gear, and the extruder receiving a filament driven by the gear.

6. The control mechanism for end effector maneuver of claim 5 further comprising a heating element in connection with the extruder, melting the filament out at an extruder tip.

7. The control mechanism for end effector maneuver of claim 1 wherein the guide member is a vertical rail, the vertical rail slidably receiving the moving member along the vertical rail providing a linear motion of the moving member.

8. The control mechanism for end effector maneuver of claim 1 wherein the tool actuator rotates one arm of each of the plurality of arm assemblies.

9. The control mechanism for end effector maneuver of claim 1 wherein the end effector maneuvers parallel to a working surface by implementing parallelogram in the plurality of arm assemblies.

10. The control mechanism for end effector maneuver of claim 1 wherein the control mechanism comprises three arm assemblies, three actuator assemblies, and three tool actuators, each of the three tool actuators respectively rotating one arm of each of the three arm assemblies.

11. The control mechanism for end effector maneuver of claim 1 wherein the plurality of actuator assemblies are positioned substantially parallel to each other.

12. A method for controlling an end effector, the method comprising the steps of:
maneuvering an end effector by respectively actuating a plurality of arm assemblies with a plurality of actuator assemblies, each of the plurality of actuator assemblies comprising a guide member and a moving member, the moving member being slidably engaged with the guide member, the plurality of arm assemblies respectively connecting the plurality of actuator assemblies, at each of their moving members, to the end effector in pivotal relation at each connecting joints, each of the plurality of arm assemblies comprising at least two arms;
rotating at least one arm of the plurality of arm assemblies about its length with a tool actuator, thereby providing a rotational motion to the rotating arm; and
translating the rotational motion to a gear attached at the end effector with a universal joint, engaging the gear and positioned at the connecting joint between the end effector and the rotating arm.

13. The method for controlling an end effector of claim 12 further comprising the step of operating a tool in mechanical communication with the gear, the tool being positioned at the end effector wherein the tool is driven by the rotational motion of the rotating arm.

14. The method for controlling an end effector of claim 12 wherein the step of rotating at least one arm comprises rotating at least one arm of each of the plurality of arm assemblies respectively with a plurality of tool actuators, each of the plurality of tool actuators rotating one arm of each of the plurality of arm assemblies.

15. A control mechanism for end effector maneuver comprising:
an end effector;
a plurality of arm assemblies, each of the plurality of arm assemblies comprising at least two arms;
a plurality of linear actuator assemblies, each of the plurality of linear actuator assemblies comprising a vertical guide member and a moving member, the moving member being moveable along the vertical guide member, the plurality of arm assemblies respectively connecting the plurality of linear actuator assemblies, at each of their moving members, to the end effector in pivotal relation at each connecting joints; and
a plurality of tool actuators, respectively rotating at least one arm of the plurality of arm assemblies about its length, thereby providing a rotational motion to each of the rotating arms, wherein the rotational motion is translated respectively from the plurality of tool actuators to a plurality of gears attached at the end effector through the rotating arms, the connecting joints between the end effector and each of the rotating arms are universal joints each engaging one of the plurality of gears.

16. The control mechanism for end effector maneuver of claim 15 wherein one of the plurality of tool actuators is integrated to its rotating arm.

17. The control mechanism for end effector maneuver of claim 15 wherein one of the plurality of tool actuators is attached to one of the moving members of the plurality of linear actuator assemblies, the one tool actuator being positioned to rotate one of the rotating arms, such that a corresponding rotational motion is provided to the one of the rotating arms from the one tool actuator through a universal joint connecting the one tool actuator and the one of the rotating arms.

18. The control mechanism for end effector maneuver of claim 15 further comprising a spline shaft and a spline hub, the spline hub slidably receiving the spline shaft, the spline hub pivotally connecting one of the rotating arms to a corresponding moving member at its connecting joint, such that the spline hub slides along the spline shaft as the corresponding moving member moves along its vertical guide member, a corresponding tool actuator being attached to the spline shaft and rotating the spline shaft, a corresponding rotational motion being provided to the one of the rotating arms transferred from the rotating spline shaft through the spline hub.

19. The control mechanism for end effector maneuver of claim 15 further comprising a plurality of tools each positioned at the end effector, the plurality of tools respectively in mechanical communication with the plurality of gears, wherein each of the plurality of tools are driven by one of the rotating arms corresponding to one of the plurality of gears.

20. The control mechanism for end effector maneuver of claim 19 wherein at least one of the plurality of tools is an extruder, the extruder receiving a filament driven by one of the plurality of gears, the extruder comprising a heating element melting the filament out at an extruder tip.

* * * * *